July 21, 1925.

F. BEEMER

ANTIFRICTION BEARING

Filed Feb. 23, 1922

1,546,363

Inventor.
Frank Beemer,
By Butler & Denny
Attorneys.

Patented July 21, 1925.

1,546,363

UNITED STATES PATENT OFFICE.

FRANK BEEMER, OF PHILADELPHIA, PENNSYLVANIA.

ANTIFRICTION BEARING.

Application filed February 23, 1922. Serial No. 538,530.

*To all whom it may concern:*

Be it known that I, FRANK BEEMER, a citizen of the United States, residing in the city of Philadelphia, county of Philadelphia, and State of Pennsylvania, have invented certain new and useful Improvements in Antifriction Bearings, of which the following is a specification.

My invention relates to anti-friction bearings wherein a load acting radially to an axis of rotation is carried through balls disposed between inner and outer bearing elements, and its primary object is to provide for the use in such constructions of a plurality of sets of balls with wider distribution of the load and increased carrying capacity by simple means of efficient character comprising parts that can be made and assembled readily.

The improvements are characterized, in the preferred construction, by the combination with the inner bearing element having in its periphery a plurality of parallel circular races and a plurality of sets of balls in said races, of an outer composite ring having a plurality of races in which the respective sets of balls are engaged, said composite ring comprising a pair of rings of angular or bent cross section having peripheral parts extending toward each other with respective flanges extending inwardly from the outer extremities thereof, a circular washer or flat ring disposed between said peripheral parts and extending inwardly therefrom between the sets of balls, and a jacket having a periphery engaged on the peripheries of the washer and rings of bent cross section and inwardly extending flanges engaging the inwardly projecting flanges or faces of said rings of bent cross section.

Figure 1:
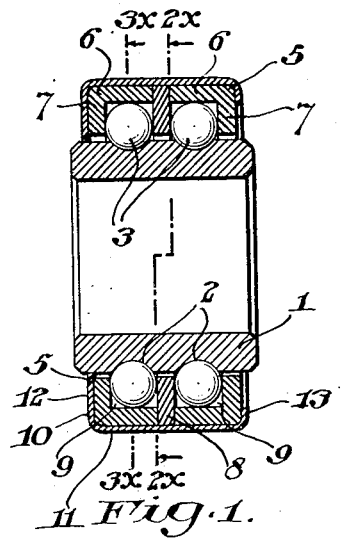
Figure 2:
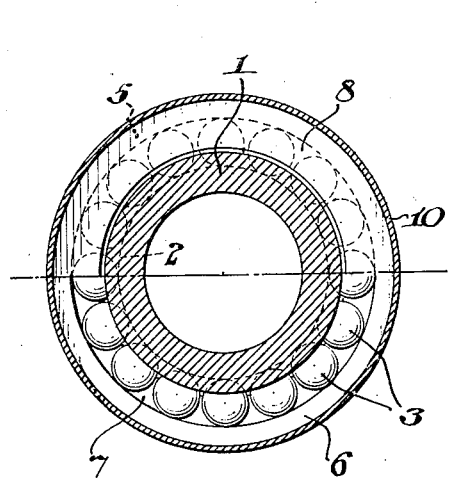
Figure 3:
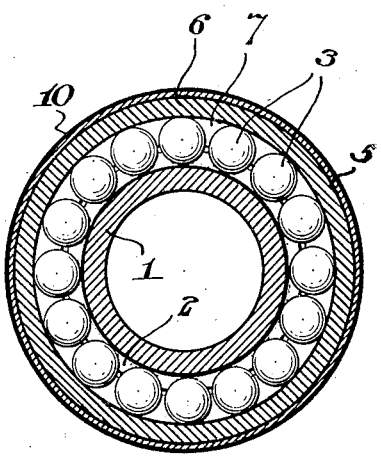

In the accompanying drawings, Fig. 1 is a sectional view taken longitudinally through the axis of a bearing embodying my improvements, Fig. 2 is a sectional view taken on the line 2ˣ—2ˣ of Fig. 1, and Fig. 3 is a sectional view taken on the line 3ˣ—3ˣ of Fig. 1.

My improved bearing, in the form thereof illustrated in the drawings, comprises the inner tubular element or relatively wide ring 1 having formed in its periphery the parallel circular races 2 whose centres are in the axis of the ring and the two sets of balls 3 engaged in the respective races.

Rings or cups 5 of angular or bent cross section, having peripheral members 6 and flanges or faces 7 projecting inwardly from ends thereof, are placed in reverse relation on the respective sets of balls 3, with their members 6 in abutting relation to the outer parts of the respective faces of a washer or flat ring 8 which has been placed between the sets of balls, the rings 5 and 8 providing outer races 9 for the balls, concentric with the inner races 3.

A jacket 10, of relatively thin and soft metal, has the peripheral section 11 which is engaged on the peripheries of the rings 5 and 8 and the inwardly projecting end flanges or faces 12 and 13 which engage the respective outer surfaces of the flanges 7, the parts 11 and 12 being formed initially as a cup adapted to be passed over or to have passed thereinto the relatively arranged parts 1, 3, 5 and 8, and the flange 13 being thereafter turned in to fix the rings 5 and 8 together on the balls 3.

Having described my invention, I claim:

In an anti-friction bearing, the combination with an inner bearing element having in its periphery a plurality of parallel circular races and a plurality of sets of balls in said races, of an outer composite ring having a plurality of races in which the respective sets of balls are engaged, said composite ring comprising a plurality of rings of angular cross section having peripheral parts extending toward each other with respective flanges extending radially inward from the outer extremities thereof and forming side bearings for said balls, a circular washer clamped between said peripheral parts and extending radially inward therefrom between and forming side bearings for said sets of balls, and a metal jacket having a periphery engaged on the peripheries of said washer and rings and radially extending flanges engaging the radial flanges of said rings.

In testimony whereof I have hereunto set my name this 16th day of February, 1922.

FRANK BEEMER.